Aug. 6, 1957 W. B. ZERN 2,801,655
HINGE SEAT ROUTER WOODWORKING APPARATUS
Filed Sept. 14, 1954 4 Sheets-Sheet 1
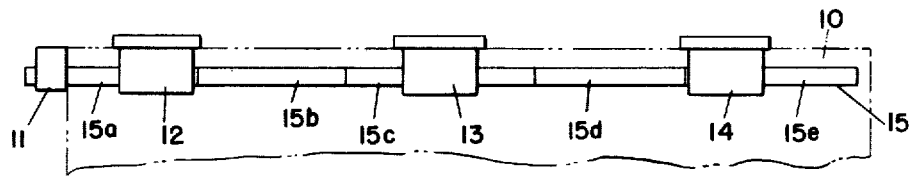
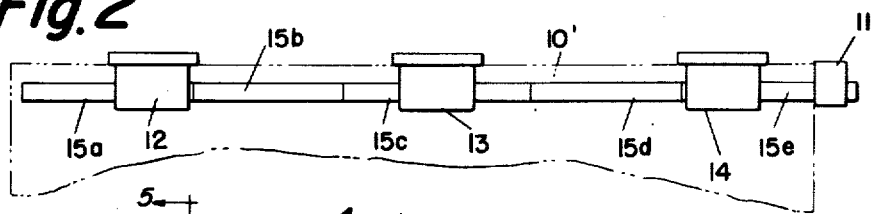
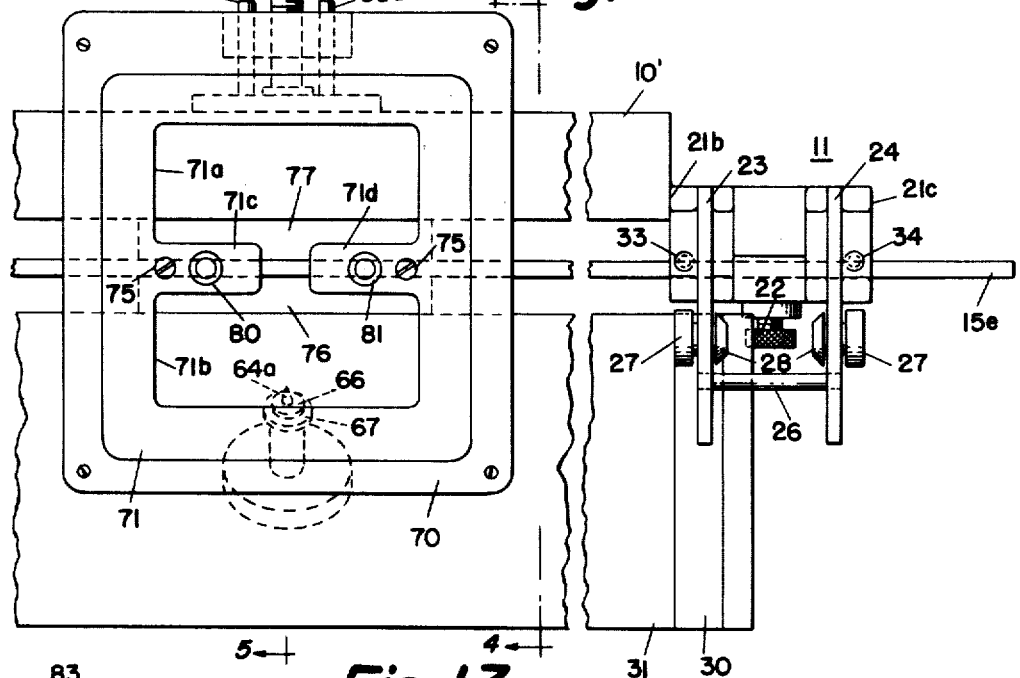
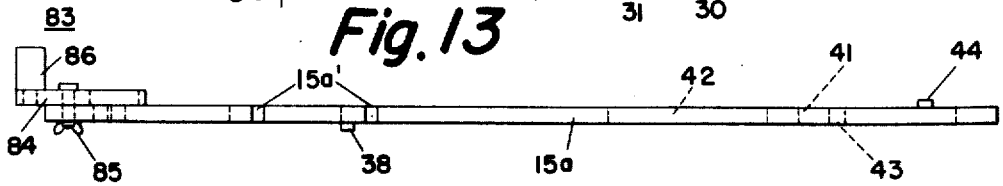

Aug. 6, 1957  W. B. ZERN  2,801,655
HINGE SEAT ROUTER WOODWORKING APPARATUS
Filed Sept. 14, 1954  4 Sheets-Sheet 4
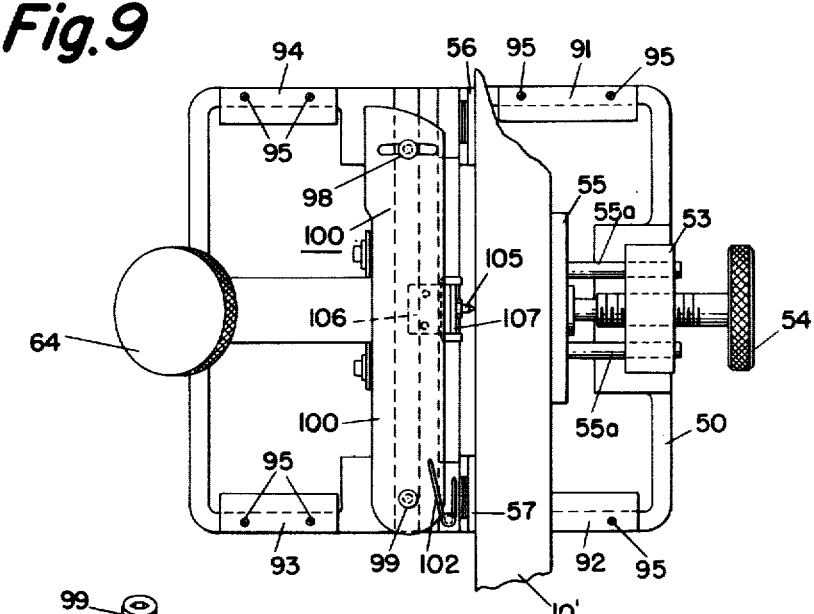
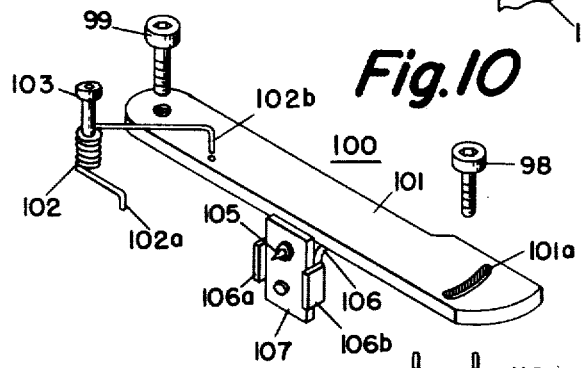
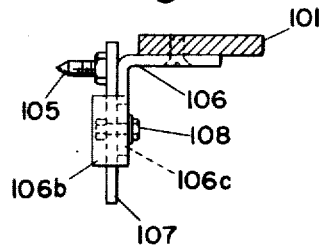
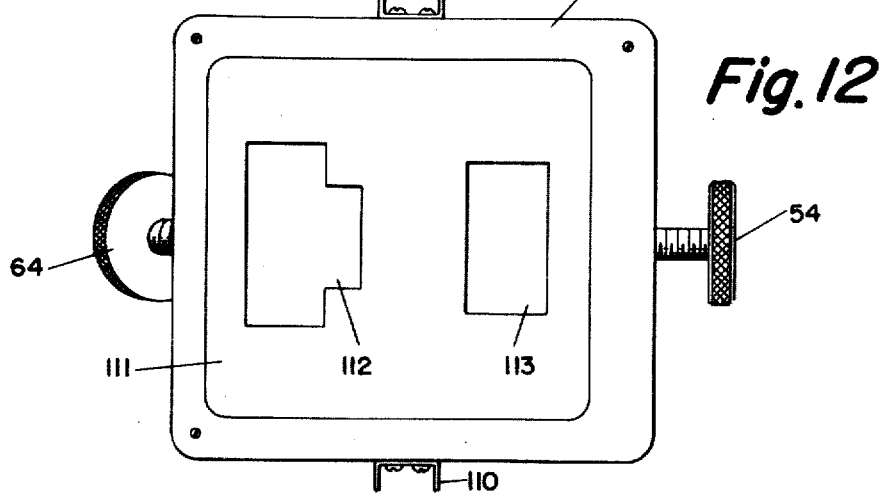

United States Patent Office 2,801,655
Patented Aug. 6, 1957

2,801,655

HINGE SEAT ROUTER WOODWORKING APPARATUS

Warren B. Zern, near Pottstown, Pa.

Application September 14, 1954, Serial No. 455,890

16 Claims. (Cl. 144—27)

This invention relates to woodworking apparatus generally of the type shown in my Patents Nos. 2,355,603, 2,427,081 and 2,605,791, and Schwarzer Patent No. 2,605,790 assigned to me. It has for an object the provision of an improved apparatus for locating a jamb relative to a door for quickly and accurately routing hinge seats in a jamb and a door as well as the recesses for the door lock and the striker plate on the jamb.

While the devices described in the above-mentioned patents have proven reasonably successful in practice, in each instance it was necessary to take into account the width of the door jamb in assembling a jamb with respect to a door with these devices for a routing operation. In accordance with the present invention jambs of any width will be quickly and accurately positioned with respect to the edge of the door for the routing operation without the need of any change being made in adjustment of the apparatus due to variation in width of the jambs.

Further in accordance with the present invention, the woodworking apparatus has been substantially simplified in its construction whereby fewer parts are required, and the adjustment of said parts is simplified over the devices disclosed in the above patents.

For a more detailed disclosure of the invention and for further objects and advantages thereof, reference is to be had to the following description taken in conjunction with the accompanying drawings, in which:

Fig. 1 diagrammatically illustrates woodworking apparatus including a jig assembly embodying the present invention as applied to a left-hand door;

Fig. 2 diagrammatically illustrates woodworking apparatus including a jig assembly embodying the present invention as applied to a right-hand door;

Fig. 3 is a fractional top plan view of the portion of the jig assembly at the head end of the door and including a template assembly and jamb locator assembly;

Fig. 9 is a bottom plan view of the template assembly shown in Fig. 6 and including lock jig attachments;

Fig. 10 is a perspective view of the spindle-locating attachment of the lock jig;

Fig. 11 is a fractional view of the marking point of the spindle-locating attachment;

Fig. 12 is a top plan view of Fig. 9; and

Fig. 13 is a top plan view of the section of the jig frame adjacent the bottom end of the door.

Figure 4:
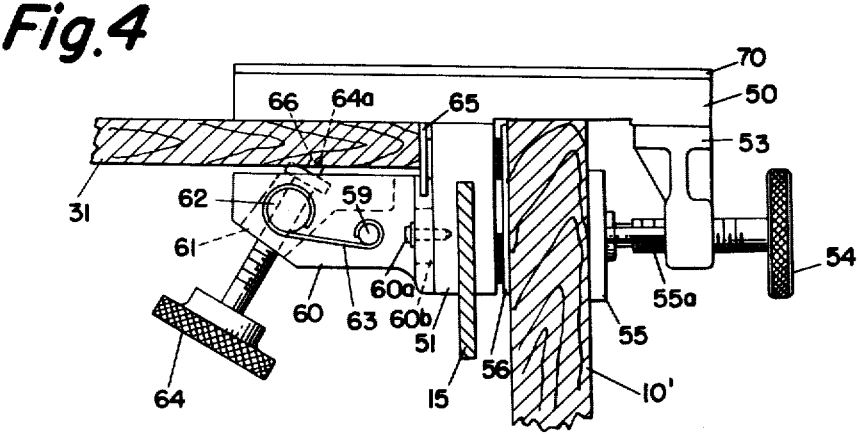
Fig. 4 is an elevation view taken along the lines 4—4 in Fig. 3.

The present invention is applicable to routing hinge seats in a jamb and a door, whether the door be a left-hand door or a right-hand door. Left-hand and right-hand doors are terms which refer to the swing of the door, as explained in the aforementioned Patent No. 2,605,790. When facing a closed door so that it opens away from the observer, the position of the hinges relative to the observer, left or right, determines the swing of the door. In applying my woodworking apparatus to a door, the locating is accomplished from the head end of the door, whether the door be a left-hand one or a right-hand one. The head end or top end is that end which is adjacent the dado in the jamb when the finished door is hung in its frame. Accordingly, all of the operations to be performed on the door and jamb with my woodworking apparatus are accomplished with the head end of the door positioned relative to the head end or dado end of the jamb and in the same relationship they will have when assembled in the finished door and door frame.

In Fig. 1 my invention has been diagrammatically illustrated in one form as applied to a left-hand door 10. The jamb locator assembly 11, which itself is of novel construction, has been illustrated in alignment with the head end of left-hand door 10, and the template assemblies 12, 13 and 14 have been illustrated at spaced locations along a jig frame assembly 15, such locations having been predetermined for the proper position of the hinge seats to be routed in the edge of the left-hand door 10. While the jig frame assembly 15 has been illustrated as comprising five sections 15a—15e so that the length of the hinge jig assembly is about as long as the door 10, it will hereafter be pointed out that the middle sections 15b—15d may be eliminated and the edge of the door 10 may itself act as the frame for the woodworking apparatus.

Similarly in Fig. 2, there has been illustrated a right-hand door 10', the head end of which is at the opposite end of the door shown in Fig. 1. Thus, the jamb locator assembly 11 is shown positioned in alignment with the head end of right-hand door 10' and at the opposite end of the hinge jig frame assembly 15 from that illustrated in Fig. 1.

The frame 15, Figs. 1 and 2, is of the telescoping variety generally of the type disclosed in the aforesaid Patent 2,605,790. However, in the present application, the template assemblies 12, 13 and 14 remain in fixed positions on their respective frame sections 15a, 15c and 15e, with these frame sections being telescoped with respect to frame sections 15b and 15d to adjust for different lengths of doors. The present invention eliminates the need for changing the location of the template assemblies when changing from right-hand doors to left-hand doors as was previously required in aforesaid Patent 2,605,790. In accordance with the present invention, all that is necessary to change the setting of the jig assembly from a right-hand door set-up to a left-hand door set-up is to move the jamb locator assembly 11 from its position shown in Fig. 2 to its position shown in Fig. 1 at the opposite end of the jig frame leaving the template assemblies in their same locations on the frame. This simplicity in change-over from right-hand to left-hand doors is to a considerable extent brought about by the novel construction of the jamb locator assembly which permits ready and accurate location of jambs for either right-hand or left-hand doors.

*The jamb locator assembly*

More particularly, to adjust the jig assembly for operation on right-hand doors 10' as shown in Figs. 2 and 3, the jamb locator assembly 11 is secured to the right-hand end of frame 15, such right-hand end comprising frame section 15e. To insure that the jamb-locating assembly 11 will be securely locked to section 15e so that it will not accidentally be moved during the subsequent routing operations, the section 15e is provided with a pair of L- shaped notches 15e', Fig. 8, for receiving the pair of pins 20 carried by the jamb locator assembly 11. The jamb locator assembly comprises a body member 21 having a U-shaped opening for receiving the end section 15e, Fig. 7. Portion 21a disposed to one side of the U-shaped opening is provided with a screw threaded member 22, the inner end of which extends through portion 21a for engagement with end section 15e. Thus, when the body member 21 is placed on end section 15e with the pins 20 moved to the inner ends of the L-shaped openings 15e', the threaded member is then tightened against the end section 15e to lock the jamb locator assembly 11 securely to the section 15e. The opposite ends 21b, 21c of the body member, Figs. 3 and 8, form the locating surfaces for the head end of the doors, surface 21b being the locating surface for right-hand doors and surface 21c being the locating surface for left-hand doors.

Figure 7:
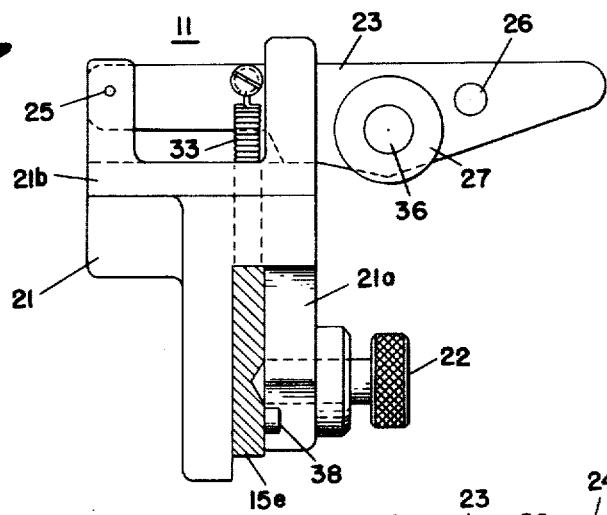
Fig. 7 is a side elevation of the jamb locator assembly shown in Fig. 3.
Figure 8:
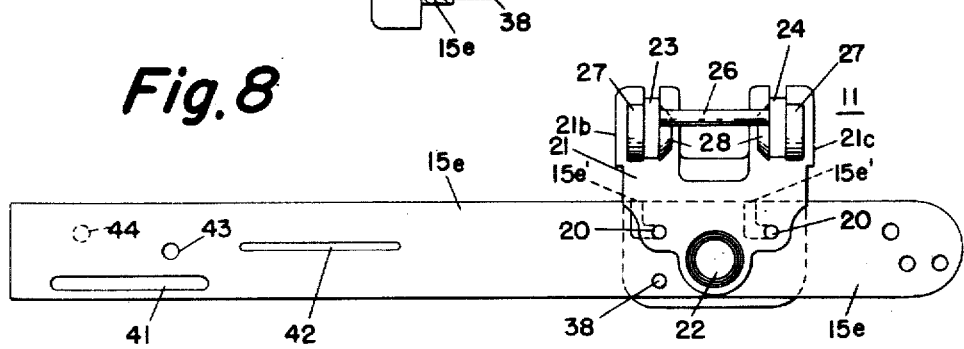
Fig. 8 is a front elevation of the jamb locator assembly mounted on the end frame section of the jig assembly.

On the top of the body member 21 is a pair of jamb-locating arms 23 and 24, Figs. 3 and 8, pivoted to the body 21 at 25, Fig. 7. Arm 23 carries structure for locating a jamb relative to a right-hand door and arm 24 carries structure for locating a jamb relative to a left-hand door as now to be described. The arms 23 and 24 are interconnected at their outer ends by means of a rod member 26, and each of the arms 23 and 24 is provided with a cylindrical jamb stop 27 and a conical shaped cam member 28. The members 27 and 28 are disposed on opposite sides of each of the arms 23 and 24, as shown in Fig. 3 with the conical cam member 28 on arm 23 adapted to engage the upper edge of the dado 30 to move the corresponding stop member 27 against the lower edge of the dado 30 in jamb 31. The arm 23 is biased downwardly toward the jamb 31 by means of a coil spring 33, Figs. 3 and 7, to assist in aligning the dado 30 with the jamb stop 27. A similar spring 34 is provided for arm 24. Spring 34 aids spring 33 in providing a downward biasing component on arm 23 by reason of the rigid interconnection 26 between arms 23 and 24. This construction also provides for increased rigidity of the arms 23 and 24 and insures accurate alignment of the dado with the head end of the door. In order to accommodate dado grooves of different widths, the members 27 and 28 preferably are carried on the arms 23 and 24 by means of a threaded member 36 so that shims may be placed between the arms and their corresponding members 27 and 28 to vary the overall dimension between the outer edge of member 27 and the outer edge of member 28.

It will be understood that when the jamb locator assembly 11 is placed at the opposite end of frame 15 for operation on left-hand doors, the elements 27 and 28 on jamb-locating arm 24 will engage the dado groove on the jamb for positioning the latter relative to the head end of the left-hand door 10. The construction of the jamb-locating assemblies is such that arms 23 and 24 cooperate through the connecting member 26 to reinforce each other whether the apparatus be applied to left-hand doors or right-hand doors. The end section 15a, Fig. 13, of the jig frame assembly is the same as the section 15e shown in Fig. 8, but with the section reversed end for end. The jamb locator assembly 11 is applied to section 15a in the same manner as previously described in connection with section 15e, and locating surface 21c will then be positioned for engagement with the head end of the left-hand door 10. A guide pin 38 is provided on the end sections 15a and 15e, Fig. 8, for assisting in the assembly of the woodworking apparatus. The guide pin 38 prevents the operator from assembling the jamb-locating assembly 11 on the wrong side of the respective end sections 15a and 15e.

*Template assembly and jamb clamp*

As previously mentioned, the template assemblies 12, 13 and 14 also are attached to the jig assembly frame 15. Each of the template assemblies is provided with screw means, such as thumb screw 40, Fig. 5, adapted to be inserted in slots in the frame 15, such as slots 41 and 42 shown in Figs. 8 and 13. The slots 41 and 42 have a substantial length in the order of 2 to 3 inches to permit the template assemblies to be adjusted length wise of the frame 15 to accommodate doors with different sizes of door rails as well as for different size hinges. These slots are particularly advantageous in permitting the jig assembly to be adjusted for routing hinge seats in small doors, such for example, as cabinet doors.

If the routing operations are to be performed on doors of standard size, the template assemblies may be readily and accurately located on the frame 15 by inserting the thumb screw 40 through the corresponding holes 43 in the various frame sections. This eliminates the need for measuring the distance between the assemblies, since the location of the holes 43 in the sections of the frame 15 have been predetermined for standard size doors. To prevent the operator from assembling the template assemblies on the reverse side of the frame sections, there is provided means for controlling the assembly of the template assemblies and their corresponding frame sections, such means being illustrated as a projecttion or stop pin 44. In Fig. 8 the stop 44 projects outwardly of section 15e and into the plane of the paper as illustrated therein. It will be noted that similar slots, holes and pins have been provided in the end section 15a illustrated in Fig. 13.

Figure 5:
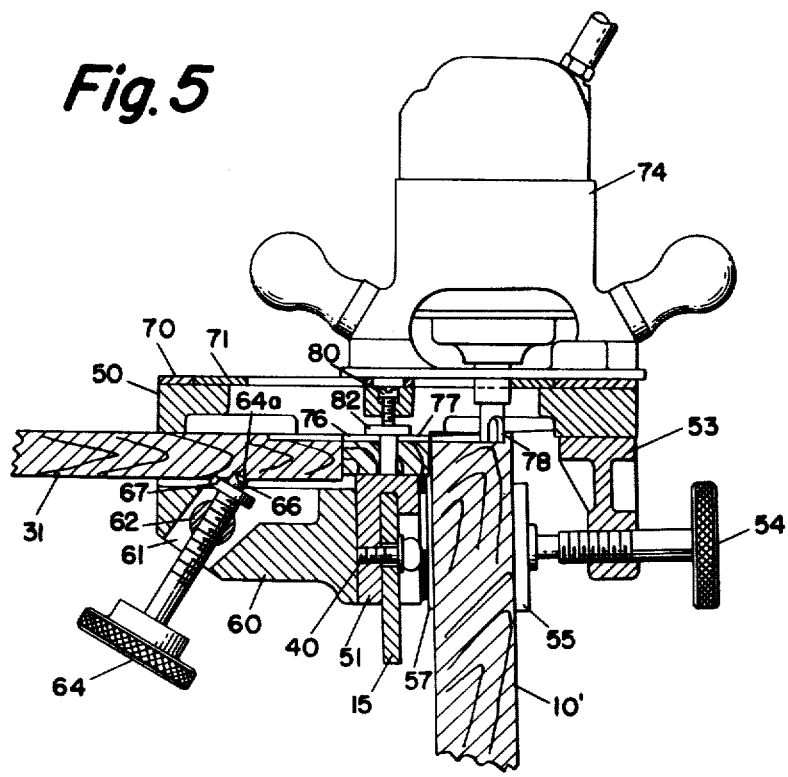
Fig. 5 is a view in cross section taken along the lines 5—5 in Fig. 3 with a router disposed on the template assembly for routing a hinge seat in the door and jamb.

With the template assemblies and the jamb locator assembly 11 attached to the jig frame 15, the jig assembly as a whole is then ready to be placed on the edge of the door into which the hinge seats are to be routed. As indicated in Fig. 3, the hinge jig assembly is adjusted lengthwise of the door until the locating surface 21b engages the head end of the door 10'. The template assemblies 12, 13 and 14, of which assembly 14 shown in Fig. 3 is exemplary, are then clamped to the door 10' in their proper positions for the hinge-rounting operations. Each of the template assemblies is provided with a frame 50, Fig. 4, that is adapted to extend over the hinge-receiving edge of the door as well as the hinge-receiving surface of the jamb. In the normal routing position the frame 50 will lie in a substantially horizontal plane parallel to the plane of the jamb, whereas the normal plane of the door will be substantially perpendicular to this plane and thus lie in a substantially vertical plane, as illustrated in Figs. 4 and 5. Each of the template frames 50 includes a downwardly extending section 51 including a cut-away portion for receiving the corresponding sections of the frame 15.

In order to clamp the template assemblies to the door there is provided a second downwardly extending section 53 preferably provided with a threaded opening through which extends the threaded clamping member 54. The inner end of the member 54 is provided with a pad 55 which is adapted to move against one face of the door 10' and clamp the opposite face of the door 10' against door-locating surfaces 56 and 57, Figs. 4 and 5. To prevent the clamping pad 55 from rotating upon adjustment of clamping screw 54, the pad 55 is provided with a pair of spaced guide pins 55a, Figs. 3 and 4, that slide in openings in section 53 during the clamping operation.

To adapt the template assemblies for use on either square-edge doors or bevel-edge doors, the clamping surfaces of members 55, 56 and 57 are parallel to each other and are disposed at an angle slightly greater than a right angle with respect to the upper surface of the template frame. The aforementioned angle is approximately 93.5°, the 3.5° corresponding to the taper on the finished hinge seats from the open end of the hinge seat to the rear. The taper is provided to prevent the door from becoming "hinge bound," all as more fully described in the aforesaid Patent 2,605,790.

After the hinge jig assembly has been secured to the edge of the door 10' by tightening the clamping screws 54, the jamb 31 is then ready to be clamped in position relative to the door 10'. Depending from the bottom of frame 50, Figs. 4 and 5, and projecting outwardly from downwardly extending section 51 is a jamb bracket 60 having an opening 61 extending therethrough in a diagonal direction with respect to frame 50. A pivotal supporting member 62 extends transversely of the opening 61 with its axis substantially parallel to the normally horizontal plane of the template frame 50. Pivotal member 62 is provided with an internally threaded opening through which clamping member 64 is screwed. The clamping member 64 is adapted to engage the underside of jamb 31 to force it upwardly so that the upper surface of the jamb 31 will engage the lower surface of frame 50 as in Figs. 4 and 5, and also to move the forward edge, or hinge seat edge of the jamb against the locating surfaces 65, Fig. 4. The pivotal support 62 is spring-biased as by a spring member 63, one end of which engages the pivotal support 62 and the opposite end of which engages a pin 59 extending from member 60, Fig. 4.

Heretofore, in the various prior arrangements for clamping a jamb relative to a door for hinge-routing operations, it has always been necessary to take into account the width of the jamb. Since the jamb widths do vary for different door sizes, this has necessitated the use of fairly complicated arrangements to compensate for the changes in jamb width.

In accordance with the present invention, the novel construction of the jamb clamp 64 eliminates the necessity of making any separate adjustments to correct for differences in jamb widths. For example, in the aforesaid Patent 2,605,790 it was necessary to adjust the jamb clamp relative to the template frame when changing from one size of jamb to another. This gave rise to some difficulties in operation of the hinge jig assembly there disclosed when the operators, through oversight, failed to make such adjustments. In the present device no such adjustment is necessary.

More particularly, as will be seen in Figs. 4 and 5, when the jamb 31 is inserted in the opening below frame 50 and above bracket member 60, the point 64a on clamp 64 first will engage the under-surface of jamb 31, followed by cam surface 66 to move the upper surface of the jamb against the bottom of template frame 50. The point 64a penetrates the jamb surface and acts as a pilot or guide for cam surface 66 preventing the latter from "rolling" the jamb lengthwise of the jig when the knob of clamp 64 is turned to tighten the clamp on the jamb. Due to the oblique angle formed between the plane of template frame 50 and the axis of clamping member 64 the jamb 31 is diagonally moved upward and over until it engages the bottom of template frame 50. Upon further inward adjustment of jamb clamp 64 and with the second cam surface 67 now engaging the under-surface of the jamb 31, the jamb 31 will be moved horizontally to the right, as shown in Figs. 4 and 5, against the locating surface 65. The amount of horizontal movement will generally be relatively small, such for example, in the order of 1/16" to 1/8", since the jamb 31 will ordinarily be inserted almost into its proper position by the operator before he tightens the clamping member 64. The action of the clamping member 64 is such that after engagement of point 64a and cam surface 66 with the under-side of jamb 31 there will be a slight clockwise rotation of clamp 64 about its pivotal support 62 as viewed in Figs. 4 and 5 accompanied by engagement of the second cam surface 67 with the under-side of jamb 31. As a result of the foregoing action, the hinge-receiving edge of jamb 31 will be forced tightly against the bottom of template frame 50 and against the jamb-locating surfaces 65.

Since both the vertical and horizontal movements of jamb 31 are accomplished by engaging the bottom surface of the jamb, there is avoided the necessity of applying horizontal force to the outer edge of the jamb as heretofore required. Thus, the novel construction of the clamping device 64 readily accommodates jambs of any width, and there is eliminated the possibility of errors arising due to failure of an operator to make the appropriate adjustment for change in jamb width. While the point 64a and the cam surfaces 66 and 67 project into the lower surface of jamb 31 in order to clamp the jamb in its proper relationship with respect to the template assembly, the fact that this surface of the jamb is marred during such operation is of no consequence since this is the inner surface of the jamb when the door frame is assembled, and thus is not exposed to view.

When a change is made in the thickness of the jamb stock in the order of 1/4" or more it is preferable to make a corresponding change in the position of jamb bracket 60 relative to the template frame 50. To accomplish this the jamb bracket 60 is provided with a pair of slots 60b through which extend lock screws 60a, the latter locking the jamb bracket to member 51 at the selected position, Figs. 4 and 6.

The template frame 50 is provided with a top plate 70 having an opening therein to receive the template 71, the latter having a cut-out of substantially H-shaped configuration to guide a routing tool 74 during the routing of the hinge seats. The sides of the H form hinge seat openings 71a, 71b corresponding to the hinge seats to be routed in the hinge-receiving surfaces of the door 10' and the jamb 31. The cross-bar of the H corresponds to the spacing between the door and the jamb in their clamped position.

It will be noted that in the present invention the woodworking apparatus or jig assembly has been constructed so that when the door and jamb are assembled on the jig assembly, they are in spaced relation one to the other, Fig. 3. This is in contrast to the prior arrangement shown in Patent 2,605,790 where the door and jamb were held tightly against each other during the routing operation. The purpose of separating the door and the jamb during the routing operation has been made necessary since under present manufacturing conditions the doors no longer run true in size, but vary in thickness from 1/16" to 1/8" from end to end of the door, particularly in regard to veneer doors. Thus, if the doors did not run true in size, it was possible for error to be made in location of the hinge seats with the jig assembly shown in Patent 2,605,790 even though the jig assembly were being operated correctly by the operator. In order to avoid this difficulty in the present invention, separate locating surfaces 56, 57 and 65 have been provided for the door and for the jamb. This assures that the hinge seats will be routed to the proper width to receive the corresponding sides of the hinges.

The template openings 71a and 71b are interconnected by a narrow passageway separating the projections 71c and 71d in the template 71. The projections 71c and 71d prevent the router, Fig. 5, from falling through the template openings as would be the case if the projections 71c and 71d were omitted, thus combining openings 71a and 71b into one large rectangular opening. Additionally, the H-shaped construction eliminates the need for using a "filler-block assembly" as described in aforesaid Patent 2,605,790 when routing hinge seats in doors to be hung on steel door frames. The template 71 is adapted to be secured to the template frame 50 as by screws 75.

As the door and jamb are in spaced relation during the routing operation, wooden supporting blocks 76 and 77 are provided to engage the corresponding edges of the jamb and door into which the hinge seats are to be routed. The blocks 76 and 77 support the outer edges of the jamb and door to prevent these edges from being chipped or splintered during the routing operations. Since the blocks 76 and 77 are constructed from wood or other relatively soft material, they do not damage the cutter blade 78 of the router 74. The blocks 76 and 77 are held in place beneath the template frame 50 by means of spaced screws 80 and 81, the bottoms of which are provided with pads 82, as shown in Fig. 5.

While Figs. 1 and 2 diagrammatically illustrate the woodworking apparatus as utilizing three template assemblies 12, 13 and 14 for routing three sets of hinge seats in the door and jamb, it is to be understood that the middle template assembly 13 may be removed if only two hinges are required for the particular installation. Furthermore, in installations requiring only top and bottom hinges, it is possible to eliminate the use of the frame assembly 15 and utilize only the end sections 15a and 15e with their associated template assemblies 12 and 14. As applied to a right-hand door, the end section 15e with its template assembly 14 and jamb locator assembly 11 is applied to the head end of the right-hand door 10' in the same manner as previously described in applying the whole jig assembly to the door. The opposite end section 15a of the frame 15 has been illustrated in Fig. 13 without its template assembly 12. In Fig. 13 there is shown a bottom end locating device comprising an arm 84 secured to end section 15a as by a screw 85. The member 84 at its extreme left-hand end is provided with a cylindrical stop member 86 adapted to engage the bottom end of the door. The device 83 can be adjusted relative to the adjacent end of section 15a by inserting the screw 85 through any of the holes shown at that end of member 15a, and further adjustment can be attained by rotating the device 83 to 180° from its position shown in Fig. 13. The locating device 83 correctly locates its associated template assembly 12 with respect to the bottom end of the door and jamb for accurate routing of the hinge seats in the door and the jamb.

*The lock jig assembly*

After the hinge seats have been routed in the door and one of the jambs in the manner described above, it is preferable to prepare the opposite edge of the door to receive a lock and the adjacent jamb to receive a striker plate, generally in the manner as described in my Patent 2,605,791. However, in accordance with the present invention, advantage has been taken of the novel construction of the template assemblies utilized for routing the hinge seats whereby they may be combined with novel attachments for routing recesses for the door lock and striker plate as will now be described.

Figure 6:
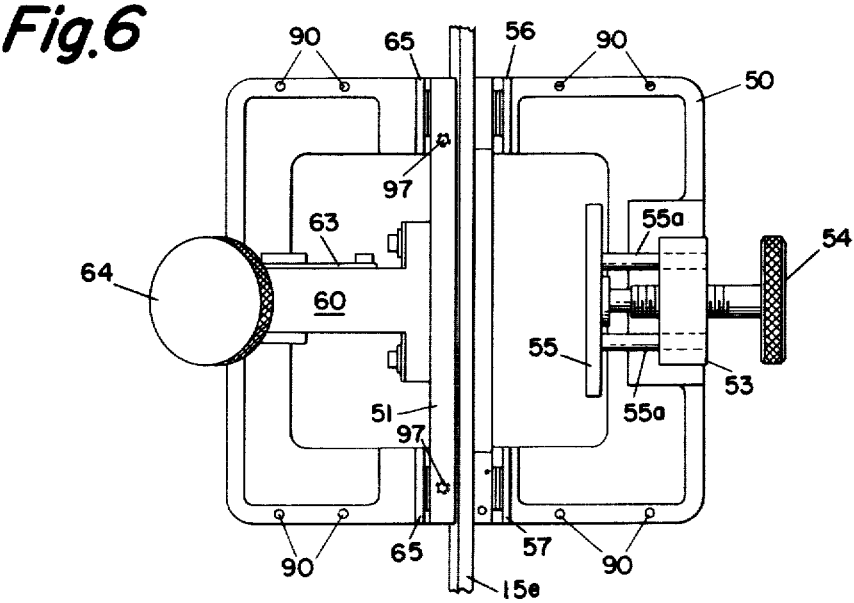
Fig. 6 is a bottom plan view of the template assembly shown in Fig. 3.

More particularly, let it be assumed that template assembly 13, shown in Figs. 1 and 2, is to be adapted to routing the recesses for the door lock and striker plate. As shown in Fig. 6, the bottom of the template frame 50 is provided with a series of threaded holes 90 over which are secured the depth control members 91–94 as by counter-sunk screws 95, Fig. 9. The depth control members which determine the depth of the recesses for the lock plate of the door and the striker plate on the jamb have been illustrated here as rectangular plate members, the height of which relative to the frame 50 may be controlled by shim washers. The depth-locating members 91 and 92 may be adjusted separately from members 93 and 94, since it is frequently necessary to rout recesses of different depths in the door than in the jamb to take into account variations in thickness as between the lock plates and striker plates. It is to be understook that other depth-locating structure may be utilized in place of the shim washer arrangement described above, such for example, as the depth control structure described and claimed by me in my aforesaid Patent 2,605,791.

Referring again to Fig. 6, it will be seen that the section 51 beneath frame 50 is provided with a pair of threaded holes 97. These holes 97 are adapted to receive a pair of screws 98 and 99 which in turn secure the automatic spindle-locating attachment 100 to the assembly. The spindle-locating attachment 100 includes an arm 101, Figs. 9 and 10, adapted to pivot about screw 99 under the bias of a spring 102. The coil of spring 102 is pinned to the frame 50 by pin 103, while the opposite ends 102a and 102b of the spring 102 are adapted to be inserted into corresponding openings in the arm 101 and the frame 50. The marking point 105 of the spindle-locating attachment 100 is carried by arm 101 by means of a bracket 106 and plate 107, Fig. 11. The plate 107 is adapted to slide between guides, 106a, 106b of bracket 106, Fig. 10, to provide for adjustment of the marking point 105 relative to the edge of the door. The plate 107 when in its selected position is bolted to bracket 106 by means of a bolt 108 that extends through plate 107 and through a slot 106c in bracket 106, Fig. 11.

The spindle-locating attachment 100 is held in fixed position by means of screw 98 during the routing of the recesses for the lock plate and striker plate. The screw 98 is tightened with respect to the slot 101a in one end of arm 101 and thus prevents the marking point 105 from engaging the surface of the door. After the routing operation, the screw 98 is loosened, thus permitting the arm 101 to be pivoted about screw 99, moving arcuate slit 101a relative to lock screw 98. The arm 101 may be moved in a counterclockwise direction as viewed in Fig. 9 to increase the stress on coil spring 102. When arm 101 is released, the spring 102 will rotate arm 101 in a clockwise direction to move the marking point 105 into engagement with the surface of the door 10', Fig. 9, to mark the location for the spindle opening.

Referring to Fig. 12, the ends of the frame 50 have been provided with a pair of bifurcated yoke members 110 similar to the yoke members described in my aforesaid Patent 2,605,791. These yoke members are adapted to receive a locating chain for cooperation with an end-locating assembly, all as fully described and claimed in my aforesaid Patent 2,605,791. It is to be understood that the locating chain and end-locator need not be utilized if a hinge jig assembly, shown in Figs. 9 and 12, is mounted on the frame 15 in a position indicated by template assembly 13, in Figs. 1 and 2. It is to be understood that the jig assembly under such conditions will then be applied to the lock-receiving edge of the door and corresponding jamb rather than to the hinge seat-receiving edge of the door and its corresponding jamb.

The template 71, Fig. 3, has been replaced in Fig. 12 with a template 111 which is provided with appropriate openings 112 and 113 corresponding to the recesses to be routed respectively in the jamb and the door for the striker plate and lock plate.

In operating the lock jig assembly the template assembly shown in Figs. 9 and 12 is applied to the lock-receiving edge of the door and clamped in its proper position by means of clamp 54. The jamb into which the striker plate recess is to be cut is clamped into its proper position adjacent the door by means of clamping member 64, all as more fully described above in connection with the template assemblies for routing hinge seats. The lock jig template assembly may be positioned relative to the head end of the door either by means of the locating chain and end-locator assembly, as described in my Patent 2,605,791, or by use of the jig frame 15, shown in Figs. 1 and 2. When the jig frame 15 is used, the end template assemblies 12 and 14 may be removed from the frame if desired, or they may remain in their positions as illustrated in readiness for routing hinge seats in another door. After the seats for the lock plate and striker plate have been routed, the location of the lock spindle is then automatically performed by releasing the arm 101 for movement in a clockwise direction to bring the marking point 105 into engagement with the face of the door to mark the latter, Fig. 9.

The spindle-locating attachment 100 which automatically marks the door as above described is an improvement over the arrangement disclosed in my Patent 2,605,791 in which it was necessary to use a separate marker plate or template having openings corresponding to the standard locations for tubular lock spindles. In that arrangement it was necessary to insert a pencil or other marking tool through the template openings to mark the door. This arrangement left something to be desired, since the template or marker plate was disposed underneath the assembly as a whole and thus was not readily accessible. In accordance with the present invention, it is not necessary for the operator to be able to see beneath the jig assembly to mark the door as was the case in my prior patent. In the present arrangement, the operator may release the arm 101 by loosening screw 98 and permitting the marking point 105 to move against the door for accurate location of the spindle. This operation may be performed by one hand by the operator, and it is not necessary for the operator to see the various parts of the spindle-locating attachment 100 during the marking operation, as the marking point 105 is preset to its proper position by the operator before the jig assembly is assembled onto the door.

After the seats of the lock plate and striker plate have been routed in the door and the jamb, the door may be drilled to provide a recess for the tubular lock usually used on doors. Drill guides of the type disclosed in my Patent 2,605,791 may be utilized for this purpose.

Having described the various features of my invention in detail, it will now be seen that by reason of the novel construction the various routing operations to be performed on a door and its jambs can be quickly and accurately accomplished with a minimum amount of effort on the part of the operator and with a minimum chance for error in locating the various recesses. The present invention not only reduces the number of adjustments necessary in preparation for the routing operation, but has simplified the various adjustments and has made it possible to perform the operations with a minimum of special equipment.

It is believed that this is the first time there has been made available woodworking apparatus that will permit hinge seats to be routed in the door and seats for the lock plate and striker plate all with the same equipment.

While there has been described a preferred embodiment of the invention, it will be understood that further modifications may be made without departing from the spirit and scope of the invention as set forth in the appended claims.

What is claimed is:

1. In a woodworking apparatus for positioning jambs of various widths relative to a template without requiring adjustment for differences in jamb widths, a template assembly comprising a frame adapted to be supported in a horizontal position, a template horizontally supported on said frame, structure depending below said frame for engagement with an edge of the jamb, a pivotal support carried by said structure, a threaded clamping member carried by said pivotal support, the axis of said threaded clamping member diagonally intersecting the horizontal plane of said frame, and means carried by said threaded clamping member engageable solely with the bottom side of the jamb first to move the upper side of said jamb against the bottom of said template frame and then to move the edge of said jamb against said depending structure upon rotation of said threaded clamping member about its pivotal support, said last-named means providing the entire support for the jamb.

2. An apparatus for positioning work pieces of various widths relative to a template without requiring adjustment for differences in width comprising a frame adapted to support a template, structure depending from said frame for engagement with a side of the work piece, a pivotal support carried by said pivotal structure, a movable clamping member carried by said support, the axis of movement of said clamping member diagonally intersecting the plane of said template, and means carried by said clamping member engageable solely with another side of the work piece, first to move the work piece against said frame and then to slide the work piece along said frame into engagement with said depending structure upon rotation of said clamping member about its pivotal support, said last-named means providing the entire support for the work piece.

3. Woodworking apparatus for routine recesses for hinges, lock plates, striker plates, and the like in a door and jamb preparatory to installation comprising a supporting frame, a plurality of template assemblies, a jamb-locating assembly carried by said frame at one end thereof for positioning a jamb relative to the door, means carried by each of said template assemblies for clamping the door to said frame, clamping means carried by each of said template assemblies for clamping the jamb in fixed position relative to said frame, one of said template assemblies including a template having cut-outs corresponding to the shape of a lock plate and striker plate, said other template assemblies including templates having cut-outs corresponding in shape to the hinge plates to be mounted on the hinge-receiving edge of the door and a jamb, and means for interchangeably connecting said template assemblies to said frame whereby said template assemblies in selected number may be assembled on said frame for routing recesses having different shapes.

4. The combination set forth in claim 3 wherein said jamb-locating assembly includes a pair of jamb-locating arms, one for locating a jamb relative to a right-hand door and the other for locating a jamb relative to a left-hand door, and means for detachably securing said jamb-locating assembly to either end of said frame as determined by the swing of the door.

5. In a woodworking apparatus a universal jamb-locating assembly for positioning a jamb relative to right-hand or left-hand doors comprising a body member including clamping means for clamping said assembly to the frame of the woodworking apparatus, locating structure carried by said body member and adapted for selective engagement with the head end of a right-hand door, a pivoted arm carried by said body member and adapted selectively to engage a jamb to locate the latter lengthwise of the right-hand door, a second locating structure carried by the body member and adapted for selective engagement with the head end of a left-hand door, a second pivoted arm carried by said body member and adapted selectively to engage a jamb to locate the latter lengthwise of the left-hand door, spring-biasing means carried by each of said arms to pivot said arms in a direction toward said body member, and means interconnecting said arms to combine the biasing effects of said spring means when operating upon either right-hand or left-hand doors.

6. An apparatus for positioning a work piece relative to a template comprising a frame adapted to support a template, structure depending from said frame for engagement with a side of the work piece, a projection extending from said depending structure to one side of said frame and engageable with another side of the work piece providing a temporary support for the work piece relative to said template, a pivotal support carried by said projection, clamping means carried by and movable relative to said pivotal support, the axis of movement of said clamping means diagonally intersecting the plane of said template, and means carried by said clamping means engageable with said last-named side of the work piece, first to move the work piece off said temporary support and against said frame and then to slide the work piece along said frame into engagement with said depending structure upon rotation of said clamping means about its pivotal support.

7. Apparatus for clamping a work piece comprising a frame having first and second locating surfaces forming an angle therebetween to receive the work piece, structure carried by said frame and disposed opposite one of said surfaces, a pivotal support carried by said structure, releasable clamping means carried by and movable relative to said pivotal support, the axis of movement of said clamping means diagonally intersecting said first locating surface, and means carried by said clamping means engageable with one side only of the work piece, first to move the work piece against said first locating surface and then to move the work piece against said second locating surface and to maintain said work piece in clamped engagement with both of said locating surfaces until release of said clamping means, said means carried by said clamping means and engageable with one side only of the work piece comprising spaced cam surfaces, one adapted to engage the work piece before the other to provide the sequential movements of the work piece.

8. In woodworking apparatus for concurrently routing hinge seats in a door and jamb, means for clamping a door adjacent a jamb in spaced relation for the routing of hinge seats therein, and template means carried by said clamping means and having a cut-out to guide a routing tool during the routing of the hinge seats, said cut-out being of substantially H-shaped configuration, the sides of the H corresponding to the hinge seats and the cross-bar of the H corresponding to the spacing between the door and the jamb in their clamped position.

9. In a woodworking apparatus for positioning a jamb and door relative to a template for routing recesses for lock plates, striker plates and the like in the door and jamb, a template assembly comprising a frame having means for supporting it in a horizontal position on the edge of a door, a template horizontally supported on said frame and adapted to overlie the edge of the door and the side of the jamb, structure depending below said frame for engagement with an edge of the jamb, a pivotal support carried by said structure, a threaded clamping member carried by said pivotal support, the axis of said threaded clamping member diagonally intersecting the horizontal plane of said frame, means carried by said threaded clamping member engageable with the bottom side of the jamb first to move the upper side of said jamb against the bottom of said template frame and then to move the edge of said jamb against said depending structure upon rotation of said threaded clamping member about its pivotal support, said template having cut-outs corresponding to the shape of a lock plate and striker plate, and movable marking means on said structure below said frame and movable into and out of engagement with a face of the door for automatically locating the axis of the spindle for a door handle.

10. In the art of woodworking, the method of positioning jambs of various widths relative to a template preparatory to cutting recesses therein comprising placing a jamb beneath the template with the upper surface of the jamb adjacent the template, and applying a force solely to the bottom surface of the jamb to hold the jamb in predetermined fixed position relative to the template, said force being applied in a direction diagonally intersecting the template and in identical manner for all jambs regardless of their width.

11. In the art of woodworking, the method of positioning jambs of various widths relative to a door preparatory to cutting recesses therein comprising placing a template on the edge of a door, locking the template to the door in avoidance of relative movement therebetween, placing a jamb along the edge of the door and beneath the template with the upper surface of the jamb adjacent the template, and applying a force solely to the bottom surface of the jamb to hold the jamb in predetermined fixed position relative to the door and template, said force being applied in a direction diagonally intersecting the template and in identical manner for all jambs regardless of their width.

12. A method according to claim 11 wherein said force applied to the bottom surface of the jamb is applied at one angle until the upper surface of the jamb engages the bottom surface of the template and thereafter said force is applied along a slightly different angle to move the jamb toward the door.

13. Apparatus according to claim 7 wherein said means carried by said clamping means and engageable with one side only of the work piece includes a pointed member for engaging the work piece before the cam surfaces to penetrate the surface of the work piece and prevent the cam surfaces from rolling the work piece relative to the frame when the clamping means is rotated about its axis.

14. Apparatus according to claim 7 including means for applying a biasing force to the pivotal support for said clamping means relative to the rotation of said pivotal support.

15. In woodworking apparatus for concurrently routing hinge seats in a pair of pieces of work such as a door and jamb or the like, means for supporting the work pieces in spaced relation for the routing of hinge seats therein, and template means for overlying the pieces of work and having a cut-out to guide a routing tool during the routing of the hinge seats, said cut-out having a configuration comprising a pair of side openings interconnected by another opening, said side openings corresponding to the hinge seats and said other opening corresponding to the spacing between the work pieces in their supported position.

16. In woodworking apparatus for concurrently routing recesses in adjacent pieces of work, such as hinge seats in a door and jamb, template means for overlying the pieces of work and having interconnected cut-out areas to guide a routing tool over predetermined areas of the pieces of work during a routing operation, and structure on said template means for supporting the router while permitting the cutting tool of the router to pass from one cut-out area to the other without removal of the tool from said template means.

References Cited in the file of this patent

UNITED STATES PATENTS

| 1,224,302 | Johnson | May 1, 1917 |
| 1,417,431 | Vogt | May 23, 1922 |
| 2,398,306 | Hermanson | Apr. 9, 1946 |
| 2,605,789 | Schwarzer | Aug. 5, 1952 |
| 2,605,790 | Schwarzer | Aug. 5, 1952 |
| 2,605,791 | Zern | Aug. 5, 1952 |

FOREIGN PATENTS

| 136,209 | Germany | Nov. 17, 1902 |

UNITED STATES PATENT OFFICE

CERTIFICATE OF CORRECTION

Patent No. 2,801,655                                               August 6, 1957

Warren B. Zern

It is hereby certified that error appears in the printed specification of the above numbered patent requiring correction and that the said Letters Patent should read as corrected below.

Column 4, line 5, for "length wise" read -- lengthwise --; line 23, for "projecttion" read -- projection --; column 9, line 66, for "tis" read -- its --; line 74, strike out "pivotal", second occurrence; line 75, after "said" insert --pivotal --.

Signed and sealed this 17th day of December 1957.

(SEAL)
Attest:
KARL H. AXLINE

Attesting Officer

ROBERT C. WATSON
Commissioner of Patents